G. GORTON.
ROTARY CUTTING-OFF SAW AND THE LIKE.
APPLICATION FILED NOV. 11, 1912.
1,077,271.
Patented Nov. 4, 1913.
3 SHEETS—SHEET 1.
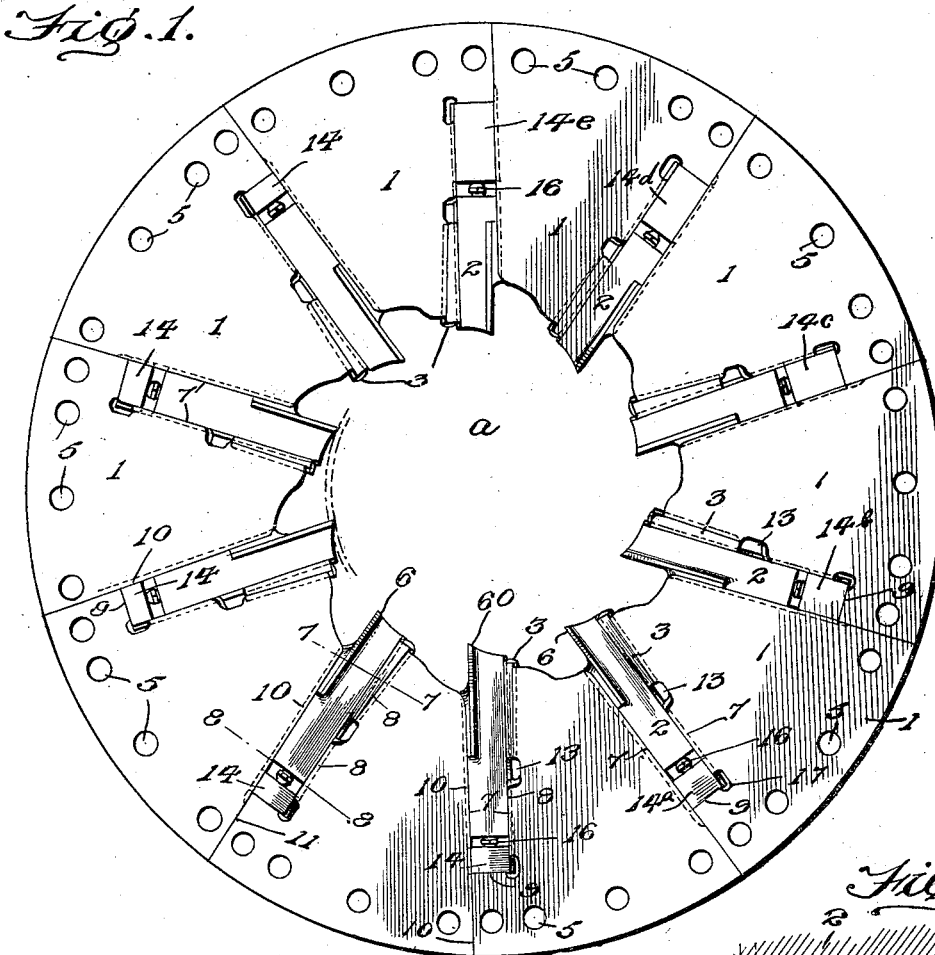
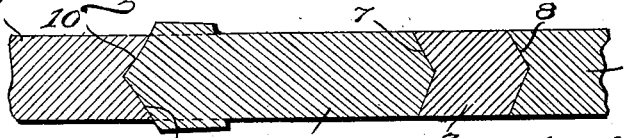
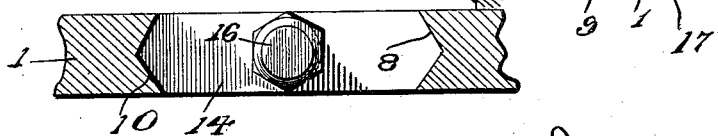
WITNESSES
W. A. Williams
E. R. Peck
INVENTOR
George Gorton
by
Hubert Peck
Attorney

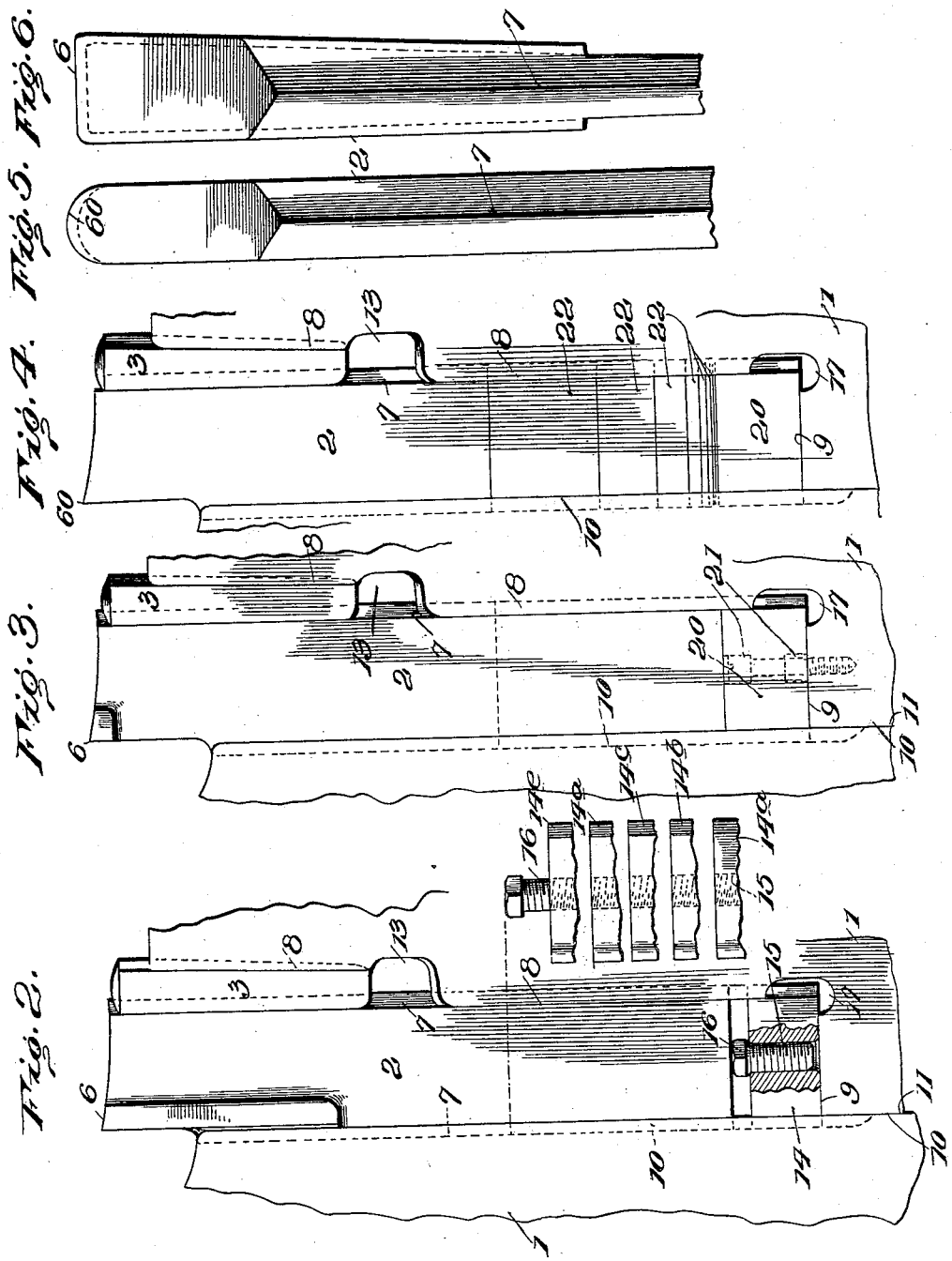

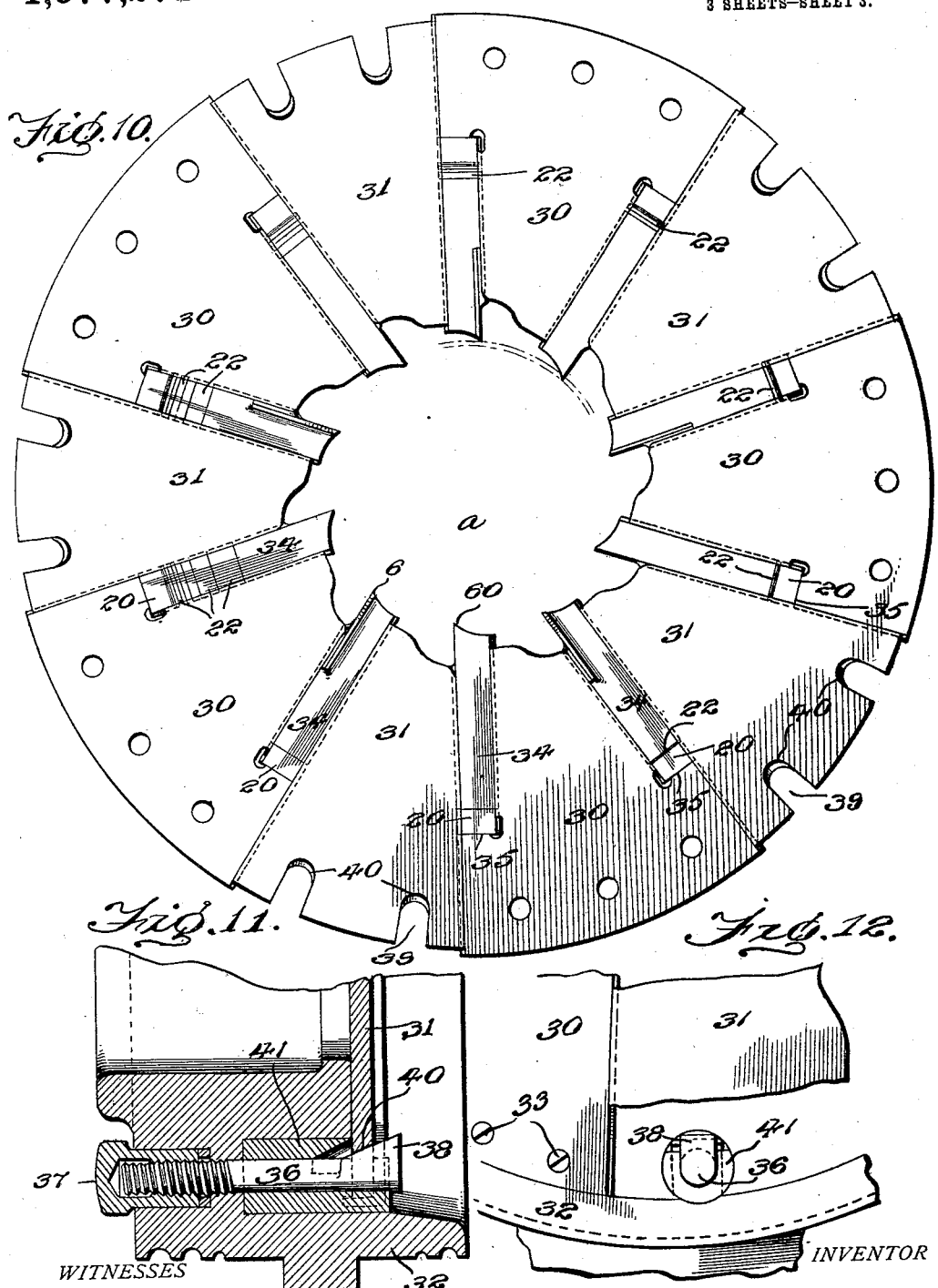

UNITED STATES PATENT OFFICE.

GEORGE GORTON, OF RACINE, WISCONSIN.

ROTARY CUTTING-OFF SAW AND THE LIKE.

1,077,271.  Specification of Letters Patent. Patented Nov. 4, 1913.

Application filed November 11, 1912. Serial No. 730,755.

*To all whom it may concern:*

Be it known that I, GEORGE GORTON, a citizen of the United States, residing at Racine, in the county of Racine and State of Wisconsin, have invented certain new and useful Improvements in Rotary Cutting-Off Saws and the like, of which the following is a specification.

This invention relates to certain improvements in rotary cutting-off saws and the like; and the objects and nature of the invention will be readily understood by those skilled in the art in the light of the following explanation of the accompanying drawings illustrating what I now believe to be the preferred embodiment or mechanical expression of my invention from among other formations, arrangements and constructions within the spirit and scope of the invention.

An object of the invention is to provide improvements in the construction of rotary cutting-off saws for the purpose of attaining economy in the matter of cutter upkeep or maintenance.

A further object of the invention is to provide improvements in the construction of rotary cutting off saws for the purpose of attaining facility in making repairs and economy in saw blade up keep.

A further object of the invention is to provide improvements in the construction of rotary cutting off saws involving advantageous features in the matter of radial cutter adjustment.

A further object of the invention is to provide certain improvements in arrangements of parts and details of construction whereby a highly efficient and improved rotary cutting off saw of the internal type will be produced.

The invention consists in certain novel features in construction and in combinations and arrangements as more fully and particularly set forth hereinafter.

Referring to the accompanying drawings: Figure 1, is an elevation of a saw constructed in accordance with my invention. Figs. 2, 3, 4, 5, and 6, are detail views. Fig. 7, is a section on the line 7—7, Fig. 1. Fig. 8, is a section on the line 8—8, Fig. 1. Fig. 9, is a detail sectional view of portions of the blade and a cutter and an adjusting or end thrust block for said cutter. Fig. 10, is an elevation of a modification, and Figs. 11 and 12, are details thereof.

The example illustrated by Fig. 1, shows a saw, (having a central work receiving opening a,) composed of a number of similar interchangeable blade sections 1, intervening cutters 2, comparatively short keys or wedges 3, backing the inner end portions of the cutters, and end thrust blocks for the cutters. In the example given, Fig. 1, the saw blade is made up of ten similar sectors or sector-shaped sections 1, each extending from the outer edge to the inner edge of the blade, and at its inner end forming a portion of the inner edge of the blade and at its outer end forming a portion of the outer or circumferential edge of the blade. The blade is adapted to be fixedly, yet removably, clamped or otherwise secured around its circumferential or outer edge portion to a rotary driving drum. For instance, I show each section provided with holes 5, in its outer end portion to receive securing means such as bolts and pins, whereby each blade section is removably secured and can be independently removed from and applied to the driving drum, when the adjacent cutter is not in operative position. In this example, each cutter 2, consists of an elongated oblong block, body or element of high speed or other required steel or metal at its inner end formed with the working or cutting point. Every alternate cutter has a comparatively wide short working point 6, and every intervening cutter has a comparatively long narrow working point 60. The cutter blocks or bodies preferably have parallel longitudinal edges 7, and these edges are usually either longitudinally grooved or ribbed to fit correspondingly formed edges of the blade sections and keys to hold the cutters and blades against lateral deflection and to properly center said parts when tightened.

The cutters are arranged radially of the blade and between the blade sections thereof, and in the example of Fig. 1, each blade section is rabbeted or cut away at its front longitudinal edge portion to form a radially elongated cutter pocket having longitudinal rear wall 8, and transverse outer end wall or abutment 9, while the front wall of the pocket is formed by the rear longitudinal or radial edge 10, of the adjacent front blade section. Each blade section has the short radial or longitudinal edge 11, extending outwardly from the end wall 9, to the outer end edge of the section. The short front edges 11, of the blade sections are formed to abut squarely and tightly against the outer end portions of the long rear radial edges 10, when the parts are assembled. The elongated cutter blocks are arranged in said pockets and are tightly locked to and with the blade sections by the comparatively short keys or wedges 3, driven longitudinally of the cutters between their rear edges and the front edges 8, of the blade sections. These keys have their longitudinal edges grooved or ribbed to intermesh with the correspondingly formed cutter and blade section edges to center the parts and hold them against lateral deflection. The rear edge 10, of each section is also longitudinally grooved or ribbed to intermesh with the front longitudinal edge of each cutter against lateral deflection. These intermeshing edges permit longitudinal movement of the keys and cutters for adjustment and tightening. The front edge of each section, at a point about midway the length of the cutter pocket, is formed with an offset forming a transverse opening 13, at the outer (small) end of the key and at the rear edge of the cutter. This opening 13, gives access to the small end of the key or wedge for driving the same inwardly to permit loosening or removal of the cutter. The portion of the cutter located outwardly (toward the floor 9) beyond opening 13, directly engages and fits the parallel edges of the adjacent blade sectors. The cutters are sharpened by grinding at the points, and hence the cutters are being constantly reduced in length by reason of the excessive duty and consequent wear to which they are subjected. The cutters are made of very expensive material and the cutters are expensive to produce. The saw blades are also expensive, and it is exceedingly desirable to reduce to the minimum all liability of damage to saw blades. It is also exceedingly desirable to economical saw upkeep, that the life of each cutter be prolonged to the maximum. I hence have provided exceedingly long cutter blocks so that a cutter can be subjected to long continued wear before becoming worn out.

In the particular example illustrated, each cutter when new presents surplus stock or length approximately equal to the distance from the perforation 13, to the outer or rear end of the cutter block, i. e. the end of the cutter toward the pocket floor. In other words, the cutter can be adjusted inwardly as its point wears away, until the heel or outer end of the cutter approximately reaches the perforation 13, or small end of the cutter locking key. Usually in cutting off saws, the inserted cutters are worn out and must be discarded when reduced in length through grinding by a fraction of an inch.

In heavy duty saws, constructed in accordance with my present invention, the cutters can be worn down or reduced several inches in length before they become worn out. For instance, in a saw of my invention, for severing twelve inch stock, the cutters can be made with approximately four inches reserve or surplus length, and hence each cutter can be reduced by wear four inches in length before becoming worn out and discharged. Various means can be provided under my invention for attaining these results and enabling me to utilize these excessively long cutters, and to reduce cost of cutter and blade upkeep to the minimum. For instance, the radial adjustment of the cutters can be determined by removable adjustable cutter-end-thrust-receiving means arranged between the heels of the cutters and the pocket floors 9, and capable of being built up or increased in length as the cutters wear so that the point of each cutter can be maintained at the required distance from the axis of rotation of the saw notwithstanding the reduction in the length of the cutter by wear.

The adjustable cutter-end-thrust-receiving means can consist of blocks, fillers or the like, interposed in the pockets between the floors 9, and the cutter heels. Interchangeable removable blocks or fillers of different sizes or lengths can be provided. I usually provide a set of fillers or blocks 14, of different sizes for each cutter pocket. Each filler is formed at its edges to project into the grooved edges 8, 10, of the adjacent blade sections and be thereby held against lateral deflection and permit the block to be slipped longitudinally into or from the pocket when the cutter is removed. The filler can be provided with a center longitudinal tapped socket 15, (see Fig. 9) to adjustably receive a screw or pin 16, to form the abutment between the block and the cutter. Slight adjustments can be made by this screw. For instance, where all of the cutters in a blade are approximately of full length, the smallest blocks 14, of the sets of blocks will be placed in the cutter pockets and any necessary adjustments can be effected by the screws 16.

When the sectors of a blade are all secured at points 5, to the rotary driving drum, the blocks 14 can be slipped into the cutter pockets and seated against floors 9, the cutters can then be slipped into said pockets and seated against the abutment screws 16, and the keys or wedges 3 can then be slipped into the pockets behind the cutters and driven home to tighten the cutters and sectors to the necessary degree. These keys tightly and rigidly lock the inner ends of the blade sectors together with the cutters and a most strong rigid structure is thereby produced. If for any reason, the saw blade should be damaged as by the broken off point of a cutter, or should become "bell mouthed" at a pocket by reason of cutter breakage or other causes, the blade sector disclosing such injury can be readily located and removed without removing or disturbing the remaining sectors, and a perfect sector can be substituted at slight expense in comparison with the expense of replacing an entire blade. Any cutter can be separately or independently adjusted or removed after its locking key has been loosened or removed. The end thrust blocks are also removable and interchangeable.

When any cutter becomes so worn by frequent grinding or otherwise that the range of adjustment of the screw 16, in its end thrust block is insufficient to maintain the cutter projected inwardly the required distance to properly locate its point in the work receiving opening $a$, the cutter, and such block are removed, and the next size larger or longer end thrust block is placed in the pocket to receive such worn cutter and compensate for reduction in the length of the cutter by wear and build up a thrust element of the required length between the floor 9, and the heel of the cutter.

Each set of blocks can be made up of any suitable number of progressively longer, or larger blocks. For instance, in a saw where each cutter can be worn down approximately four inches, I can provide six end thrust blocks 14, 14$^a$, 14$^b$, 14$^c$, 14$^d$, 14$^e$, for each cutter ranging from the small block 14, having a length of about one inch and a quarter to the largest block 14$^e$, having a length of about four inches and three quarters, with each block about three quarters of an inch longer than the preceding block. Each block will have the longitudinal tapped hole or socket to receive an adjustable abutment 16, so that each block can be built up to any accurate fractional length necessary for cutter adjustment approximately within the three quarters inch limit or whatever may be the difference in block lengths.

If so desired, each blade section can be formed with a transverse recess at the inner end of its pocket floor 9, to form a transverse opening 17, into which an implement can be inserted under the end thrust block thereon to facilitate removal thereof.

If so desired, each adjustable abutment screw 16, can be composed of a relatively soft metal, to compress or upset under abnormal or excessive endwise thrust of the cutter abutting the same. Under certain abnormal conditions a cutter is subjected to excessive endwise pressure which would result in cutter or blade damage unless relieved. When the abutment screws 16, are made of copper or other relatively soft metal, a cutter can move longitudinally and relieve such pressure where it is so excessive as to be able to overcome the resisting pressure of the cutter locking key and cause compression or upsetting of the screw. Damaged upset screws can be easily replaced at slight expense. However, I do not wish to limit all features of my invention to such relatively soft abutments, and even where soft abutments are employed soft metal pins can be used instead of screws and fractional adjustment can be provided for by grinding instead of by screw threaded pins (screws).

Various arrangements and provisions can be utilized to cause all of the narrow point cutters to project the same distance into the work receiving opening, and all of the wide point cutters to uniformly project a slightly less distance into said opening than the narrow cutters. These differences can be provided for by the end thrust radial adjustment determining devices, or by differences in the lengths of the cutter blocks, or by locating the floors or abutments 9, different distances from the axis of rotation of the saw.

The projection of the narrow points beyond the wide points is very slight, and I prefer to originally or initially make all the cutter blocks full length and accurately of the same length, and all of the blocks or fillers 14, accurately the same length, and to provide for said difference between wide and narrow points, by locating the pocket floors 9, for the narrow point cutters, the slight fraction of an inch nearer the axis of rotation than the floors 9, of the wide point cutters, that the narrow points project inwardly beyond the wide points.

The floors 9, can be accurately located in making the blade sectors, so that half the number of blade sectors of a saw will have their floors 9, located a very slight fraction of an inch nearer the outer edges of the sectors than the floors of the remaining blade sectors. By this arrangement, I can fix a certain accurate length for each cutter from point to floor 9, and can utilize a gage or other device by which each cutter can be measured up to determine the exact length that the end thrust element or filler must build up in order to fill or supply the differences between what the cutter measures and said certain accurate length required, as it is apparent that when cutters are sharpened after use no two cutter bodies will be of uniform length and such uniformity in length must be attained by means of adjusting blocks 14 or their equivalent.

Instead of manufacturing the blade sectors of a saw with differently located floors 9, as just described, to determine the different projections of the cutter points, I can make all of the sectors of a blade exactly alike with their pocket floors 9, all similarly located and then can fix end thrust or abutment blocks of different sizes or lengths on said floors to attain the different elevations that determine the different projections of the cutter points. In other words, one half of the number of blocks or abutments will be the fraction of an inch longer or wider than the remaining blocks, that the narrow point cutters are to project beyond the wide point cutters. This will enable me to make the cutter blocks all accurately of the same length and to fix one accurate length for the distance the point of every cutter must be from its said fixed block or abutment. I can utilize blocks or abutments 20 (see Figs. 3—4) for thus building up the floors 9, to different elevations and can fix these blocks to the blade sectors by machine screws 21 (see Fig. 3) extending through the blocks and into the floors 9. However, where the blade sectors are made with the cutter pockets all accurately of the same depth, i. e. the floors 9, all located alike, the cutters can be all accurately of the same length, and the narrow point cutters can be projected the desired distances beyond the wide point cutters by setting the screws 16, of the narrow point cutters differently from the screws 16, behind the wide point cutters. Building up or filling blocks such as 14, having adjustable screws 16, can be used in connection with such fixed abutments 20, to compensate for cutter wear. Instead of employing blocks such as 14, with screws, I can employ sets of blocks, plates, fillers, or shims 22, ranging in width from several thousandths of an inch, if need be, up to one or more inches. These fillers 22, can be shaped like the blocks 14, but without the adjustable screws or abutments and hence the very thin or narrow fillers are necessary to get the fine accurate measurements or adjustments. By employing a suitable gage, the operator can easily determine the length of backing or filling means required to build a worn cutter up to the length required from point to cutter pocket floor or to block 20.

I do not wish to limit all features of my invention to use in connection with a saw blade made up of sectors or other removable sections, nor do I wish to limit all features of my invention to the particular inserted cutters and means for maintaining radial adjustment thereof. Various other sectional blade arrangements might be employed and other blade section securing means might be employed and inserted cutters might be variously arranged with respect to the blade sections, and various means might be employed for locking or tightening the cutters and blade sections. For instance, among other different blade formations that might be employed, in Figs. 10, 11 and 12, I show an arrangement wherein every alternate blade sector 30, is similar and at both edges is provided with cutter pockets, while the intervening blade sectors 31, are similar to each other and do not carry cutters but constitute radially adjustable wedging or keying sections for locking the cutters and blade sectors together. The sectors 30, are removably bolted at their outer ends by screws 33, (or otherwise clamped or secured) to the rotary driving drum 32. Each sector 30, carries two removable adjustable cutters 34, such as hereinbefore described, arranged at the opposite longitudinal edges of the sector. Both side edges of each sector 30, are formed with cutter pockets such as described in connection with Fig. 1, having abutment floors 35. The longitudinal edges of the cutters are ribbed as hereinbefore described, and the edges of the blade sections are grooved to receive said ribbed edges of the cutters. Wedges or keys 3, are not employed, but the sectors 31, engage the cutters and edges of sectors 30, and on being forced radially toward the axis of rotation, act as keys or wedges to lock the cutters and sectors together to constitute a stiff rigid saw blade structure.

Various means can be employed for adjusting the sectors 31, radially of the saw for locking and releasing the cutters. For instance, I show bolts 36, extending longitudinally through the drum and at the rear end of the drum provided with rotary threaded sleeves or nuts 37 whereby the bolts can be moved longitudinally in the drum. At their front ends said bolts are provided with wedges 38, arranged in notches 39, in the outer edge portions of the sectors 31. The wedge portions of these bolts are adapted to engage beveled edges 40, of said sectors when the bolts are drawn rearwardly and thereby force said sectors inwardly to lock the cutters and sections of the saw in operative adjustment. When the bolts are moved in the opposite direction the blade sections and cutters are loosened. The sectors 31, are centered and guided in their radial movements by the projecting ends of sleeves 41, fixed in the drum and fitting in the slots or notches 39. I usually provide several wedge or tightening bolts for each sector 31, and it will be noted that the sectors 31, can be independently adjusted.

In Fig. 1, of the drawings, I show several new or full length cutter bodies or elements 2, backed only by the end thrust elements 14, and their abutment screws, and I also show the remaining cutters of the saw worn down by grinding to various reduced lengths and built up by the various fillers or end thrust elements 14$^a$, 14$^b$, 14$^c$, 14$^d$, and 14$^e$, and their abutment screws to attain the required radial adjustment or positions of the working points of such worn cutters. At the right hand side of Fig. 2, I show a set of fillers 14ª, etc., each being partially broken away and arranged to indicate how they can be successively utilized to build up the cutter body of Fig. 2, as it is gradually reduced in length to the transverse dotted line.

In Fig. 3, I indicate by a transverse dotted line, approximately the point to which the cutter body can be gradually built up by the fillers of either Figs. 2, or 4, as it is reduced in length by repeated grindings.

In Fig. 4, I show the cutter approximately worn down to its minimum length and built up by the system of fillers 22, including the very thin or graduated shims whereby very fine adjustments are attained instead of the abutment screws 16. In this connection, however, I wish to state that all features of my invention are not limited to the employment of the elongated cutter bodies or to cutter bodies interposed between the saw blade sector-shaped sections, inasmuch as such sections can receive radially arranged inserted cutters in pockets located intermediate the longitudinal edges of the sections, and said sections can be tightened by interposed wedges or keys, or as illustrated by Fig. 10.

It is evident that various changes, variations, and modifications might be resorted to without departing from the spirit and scope of my invention as set forth in the claims hereto annexed and hence I do not wish to limit myself to the particular mechanical expressions of my invention disclosed hereby.

Desiring to protect my invention in the broadest manner legally possible, what I claim is:—

1. A rotary cutting-off saw comprising a blade having a central work-receiving opening, and cutters carried by said blade and arranged around and projecting into said opening, said blade composed of sector-shaped removable sections and means for wedging the same tightly together.

2. A rotary cutting-off saw comprising a blade having a central work-receiving opening and composed of removable radially arranged sections, each extending from the inner edge of the blade to the outer edge thereof and at its outer end formed to receive securing means, interposed removable inserted cutters, and locking keys for rigidly wedging the cutters and sections together.

3. A rotary cutting off saw having a central work-receiving opening, and composed of series of abutting sectors, interposed cutters and locking keys.

4. A rotary saw blade composed of abutting sector shaped sections and inserted cutters rigidly wedged and locked together.

5. A rotary saw blade composed of removable sections, and interposed radially-arranged removable inserted cutters rigidly wedged to the sections to lock the sections and cutters together.

6. A rotary saw blade having a central work-receiving opening and composed of removable sector-shaped sections tightly locked and wedged together and at their outer ends formed for securing to a rotary driving drum.

7. A rotary saw blade having a central work-receiving opening and provided with cutters arranged around and projecting into said opening, said blade composed of removable radially-arranged sections at their outer ends formed for securing to a rotary driving drum and locking keys tightly wedging the sections to form a rigid blade.

8. A rotary cutting-off saw blade carrying tightly-wedged inserted cutters and composed of a series of separate sector-shaped sections abutting at their longitudinal edges and tightly wedged together to form a rigid blade.

9. A rotary cutting off saw blade composed of a series of separate sections, each section forming a sector of the blade and at its inner end having a cutter pocket, said sections abutting at their longitudinal edges, inserted cutters, and locking wedges.

10. A rotary cutting off saw comprising a blade composed of a series of separate removable sections, inserted cutters at the inner ends of said sections, and locking means to tightly wedge said sections and the cutters together.

11. A rotary cutting off saw comprising a blade composed of separate sections abutting at their longitudinal edges, inserted removable cutters arranged between the longitudinal edges of the sections, and locking means for tightly wedging the sections and cutters together for operation.

12. A saw blade composed of sections, interposed removable inserted cutters, and wedging means whereby the sections and cutters can be tightly locked together to form a rigid blade.

13. A rotary cutting off saw comprising a blade composed of tightly-wedged abutting sections, said sections having their edges recessed to form intervening cutter pockets, and inserted cutters adapted to said pockets.

14. A saw blade composed of separate sections, interposed inserted removable cutters, and wedging means for locking the sections and cutters together, the longitudinal engaging edges of the wedging means, cutters and sections being correspondingly grooved and ribbed to maintain the parts against lateral displacement and to permit longitudinal adjustment of the cutters between the sections.

15. A rotary cutting off saw comprising a blade having elongated radially arranged cutter pockets, elongated inserted removable cutters arranged in said pockets and adjusted longitudinally thereof, adjustable wedging means for locking the cutters in operative position in the blade, and removable means for sustaining the longitudinal thrust of each cutter and adapted to be built up to compensate for the reduction in cutter length due to wear.

16. A rotary cutting off saw comprising a blade having elongated radially arranged cutter pockets formed with abutment floors, elongated cutters all of the same length from point to heel and adapted to said pockets and adjustable longitudinally thereof to take up wear due to grinding the points thereof, and adjustable means for filling the space in said pockets between said floors and the cutter heels to determine radial cutter adjustment and to sustain the longitudinal thrust of the cutters.

17. A rotary cutting off saw comprising a blade having radially arranged cutter pockets formed with fixed abutment floors, certain of said floors being arranged at the same distance from the axis of rotation and the intervening remaining floors being uniformly arranged at a different distance from the axis of rotation, inserted cutters adapted to said pockets, said cutters being all of the same length from point to heel, said cutters adapted to be adjusted longitudinally in said pockets as they are reduced in length by sharpening, and a series of thrust blocks adapted to said pockets between said abutment floors and the heels of the cutters, said thrust blocks adapted to sustain the end thrust of the cutters and to determine the radial adjustment thereof.

18. A rotary cutting off saw having cutter pockets, cutters adapted to said pockets, means for locking the cutters in the pockets, and thrust blocks of various lengths adapted to be interposed in said pockets between the floors thereof and the heels of the cutters to sustain the longitudinal thrust of the cutters and to determine the radial adjustment thereof, said blocks being adjustable and removable to compensate for the reduction in length of the cutters by repeated sharpening.

19. A rotary cutting off saw comprising a saw blade composed of sections and providing cutter pockets between the sections, elongated inserted removable cutters arranged in said pockets and interposed between said sections, means for locking the sections and cutters together for operation, and sets of thrust blocks of different lengths adapted to fill the pockets between the floors thereof and the heels of the cutters.

20. A rotary cutting off saw having elongated radial cutter pockets formed with floors, elongated cutters removably arranged in said pockets and adjustable longitudinally thereof to take up wear due to sharpening, keys for removably locking the cutters in said blade, said pockets being greater in length than said keys, and means for determining radial cutter adjustment and for sustaining the end thrust of the cutters, toward said floors, said means adapted to be built up as the cutters decrease in length.

21. A rotary cutting-off saw comprising a blade having elongated cutter pockets formed with floors, the longitudinal edges of the portion of each pocket adjacent to its floor being parallel, elongated cutters removably fitted in said pockets against lateral displacement, each cutter having parallel longitudinal edges slidably engaging said pocket edges, means to lock the cutters in the pockets, and removable means adapted to fill the space in the pockets between the floors thereof and the heels of the cutters to determine cutter radial adjustment, said means comprising compressible members.

22. A rotary cutting off saw having a blade with elongated cutter pockets, elongated insertible removable cutters adapted to said pockets, removable keys for locking the cutters in the pockets, said pockets having floors spaced from the heels of the cutters, the longitudinal edge walls of the pockets and of the cutters and keys being longitudinally grooved and ribbed to intermesh against lateral displacement, and removable thrust blocks determining cutter radial adjustment and filling in the space of each pocket between its floor and the cutter heel and at its edges intermeshing with said edge walls of the pocket against lateral displacement.

23. A rotary cutting off saw comprising a blade having elongated cutter pockets, elongated cutters adapted to said pockets, means for locking the cutters in the blade, and removable thrust blocks having adjustable abutment screws for determining radial cutter adjustment, said blocks arranged between the floors of said pockets and the heels of said cutters.

24. A rotary cutting off saw comprising a saw blade having elongated cutter pockets, elongated cutters adapted to said pockets, means for locking each cutter in its pocket, said cutters adapted to be adjusted longitudinally in said pockets and toward the work as the cutters are reduced in length by grinding, and a series of removable interchangeable differently sized thrust blocks for filling the constantly enlarging spaces between the floors of said pockets and the heels of said cutters to determine cutter radial adjustment.

25. A rotary saw blade having a central work-receiving opening and composed of removable abutting tightly-wedged sector-shaped sections, and radially-arranged removable inserted cutters tightly locked to said sections.

26. A rotary saw blade having a central work-receiving opening and radial pockets opening thereinto, radially-arranged inserted cutters removably and rigidly locked in said pockets with their working points in said opening, said blade composed of removable sector-shaped sections rigidly locked together.

In testimony whereof I affix my signature in presence of two witnesses.

GEORGE GORTON.

Witnesses:
C. R. CARPENTER,
E. S. GERE.

Copies of this patent may be obtained for five cents each, by addressing the "Commissioner of Patents, Washington, D. C."